US008813091B2

(12) United States Patent
Maessen et al.

(10) Patent No.: US 8,813,091 B2
(45) Date of Patent: Aug. 19, 2014

(54) DISTRIBUTION DATA STRUCTURES FOR LOCALITY-GUIDED WORK STEALING

(75) Inventors: Jan-Willem Maessen, Somerville, MA (US); Jaão P. Dias, Watertown, MA (US)

(73) Assignee: Oracle America, Inc., Redwood City, CA (US)

( * ) Notice: Subject to any disclaimer, the term of this patent is extended or adjusted under 35 U.S.C. 154(b) by 1526 days.

(21) Appl. No.: 12/185,619

(22) Filed: Aug. 4, 2008

(65) Prior Publication Data

US 2010/0031267 A1 Feb. 4, 2010

(51) Int. Cl.
*G06F 9/455* (2006.01)
*G06F 9/46* (2006.01)

(52) U.S. Cl.
USPC .......................................................... 718/105

(58) Field of Classification Search
None
See application file for complete search history.

(56) References Cited

U.S. PATENT DOCUMENTS

| | | | | |
|---|---|---|---|---|
| 5,655,120 | A * | 8/1997 | Witte et al. | 718/105 |
| 5,923,875 | A * | 7/1999 | Tabuchi | 718/105 |
| 6,725,455 | B2 * | 4/2004 | Staiger et al. | 718/102 |
| 7,032,037 | B2 * | 4/2006 | Garnett et al. | 710/2 |
| 7,103,887 | B2 | 9/2006 | Shavit et al. | |
| 2002/0143965 | A1 * | 10/2002 | Aiken, Jr. | 709/229 |

OTHER PUBLICATIONS

Acar, Umut; Blellock, Guy; Blumofe, Robert; "The data locality of work stealing," Proceedings of the twelfth annual ACM symposium on Parallel algorithms and architectures, Jul. 9-13, 2000, pp. 1-12.

E. Berger, J. C. Browne; "Scalable Load Distribution and Load Balancing for Dynamic Parallel Programs," Proceedings of the International Workshop on Cluster-Based Computing 99, 1999.
Blumofe, Robert, and Leiserson, Charles; "Scheduling multithreaded computations by work stealing," Journal of the ACM, 46(5), pp. 720-748, 1999.
Narlikar, Girija, and Blelloch, Guy; "Space-efficient scheduling of nested parallelism," ACM Transactions on Programming Language Systems, 21(1) pp. 138-173, 1999.
Rob V. van Nieuwpoort, Thilo Kielmann, and Henri E. Bal: "Efficient Load Balancing for Wide-area Divide-and-Conquer Applications," Proc. Eighth ACM SIGPLAN Symposium on Principles and Practice of Parallel Programming (PPoPP'01), pp. 34-43, Snowbird, UT, Jun. 18-19, 2001.
MPI: A Message-Passing Interface Standard Version 2.1, Message Passing Interface Forum, Jun. 23, 2008.

* cited by examiner

*Primary Examiner* — Corey S Faherty
(74) *Attorney, Agent, or Firm* — Robert C. Kowert; Meyertons, Hood, Kivlin, Kowert & Goetzel, P.C.

(57) ABSTRACT

A data structure, the distribution, may be provided to track the desired and/or actual location of computations and data that range over a multidimensional rectangular index space in a parallel computing system. Examples of such iteration spaces include multidimensional arrays and counted loop nests. These distribution data structures may be used in conjunction with locality-guided work stealing and may provide a structured way to track load balancing decisions so they can be reproduced in related computations, thus maintaining locality of reference. They may allow computations to be tied to array layout, and may allow iteration over subspaces of an index space in a manner consistent with the layout of the space itself. Distributions may provide a mechanism to describe computations in a manner that is oblivious to precise machine size or structure. Programming language constructs and/or library functions may support the implementation and use of these distribution data structures.

20 Claims, 11 Drawing Sheets

|   |   |   |   | CPU 3 | CPU 1 | CPU 6 | CPU 3 |
|---|---|---|---|---|---|---|---|
|   |   |   |   | CPU 1 | CPU 5 | CPU 1 | CPU 1 |
|   |   |   |   | CPU 4 | CPU 6 | CPU 3 | CPU 5 |
|   |   |   |   | CPU 5 | CPU 1 | CPU 4 | CPU 2 |
|   |   |   |   | CPU 3 | CPU 4 | CPU 5 | CPU 5 |

*FIG. 5*

|   |   |   |   | CPU 3 | CPU 1 | CPU 6 | CPU 3 |
|---|---|---|---|---|---|---|---|
|   |   |   |   | CPU 1 | CPU 5 | CPU 1 | CPU 1 |
|   |   |   |   | CPU 4 | CPU 6 | CPU 3 | CPU 5 |
|   |   |   |   | CPU 5 | CPU 1 | CPU 4 | CPU 2 |
|   |   |   |   | CPU 3 | CPU 4 | CPU 5 | CPU 5 |

*FIG. 6*

| CPU 3 | CPU 1 | CPU 6 | CPU 3 |
|---|---|---|---|
| CPU 1 | CPU 5 | CPU 1 | CPU 1 |
| CPU 4 | CPU 6 | CPU 3 | CPU 5 |
| CPU 5 | CPU 1 | CPU 4 | CPU 2 |

*FIG. 7*

| CPU 3 | CPU 1 | CPU 6 | CPU 3 |
|---|---|---|---|
| CPU 1 | CPU 5 | CPU 1 | CPU 1 |
| CPU 4 | CPU 6 | CPU 3 | CPU 5 |
| CPU 5 | CPU 1 | CPU 4 | CPU 2 |

↑      ↑
g.left()  g.right()

*FIG. 8*

| CPU 3 | CPU 1 | CPU 6 | CPU 3 |
|---|---|---|---|
| CPU 1 | CPU 5 | CPU 1 | CPU 1 |
| CPU 4 | CPU 6 | CPU 3 | CPU 5 |
| CPU 5 | CPU 1 | CPU 4 | CPU 2 | g.left().right()   g.right().right()

*FIG. 9*

| CPU 3 | CPU 1 | CPU 6 | CPU 3 |
|---|---|---|---|
| CPU 1 | CPU 5 | CPU 1 | CPU 1 |
| CPU 4 | CPU 6 | CPU 3 | CPU 5 |
| CPU 5 | CPU 1 | CPU 4 | CPU 2 | g.left().right().region() -> CPU4

*FIG. 10*

DISTRIBUTION DATA STRUCTURES FOR LOCALITY-GUIDED WORK STEALING

The U.S. Government has a paid-up license in this invention and the right in limited circumstances to require the patent owner to license others on reasonable terms as provided for by the terms of Contract No. NBCH3039002 awarded by the Defense Advanced Research Projects Agency (DARPA).

BACKGROUND OF THE INVENTION

1. Field of the Invention

This invention relates generally to distributed computing, and more particularly to systems and methods for tracking the locations of distributed computations and/or data for a subdivided iteration space.

2. Description of the Related Art

Parallel programming has traditionally involved a tradeoff between two competing factors: the desire to express the solution to a scientific problem as simply and naturally as possible, and the need to effectively utilize the large computational resources required to obtain a solution. For the foreseeable future, the cost of communication in a large parallel machine will continue to be a limiting factor for performance. This dichotomy, then, may be viewed as a tradeoff in program structure. In other words, in some cases, a program may be structured around its communication. For example, it may be structured via explicit message passing using the Message Passing Interface (MPI) standard. In other cases, a problem may be expressed as naturally as possible with the hope of obtaining a reasonably efficient code that is adaptable and easily maintained.

Physical simulations, the stock-in-trade of parallel computing, often focus on propagating phenomena (matter, force, energy) through space. Arrays of floating-point numbers are common currency for such spatial simulation. These arrays must be carved up, either explicitly or implicitly, into pieces that can be distributed across a machine. Similarly, computations on these arrays must be carved up into pieces suitable for executing in parallel.

Individual processors are becoming parallel machines in miniature. This combined with the increasing size of large parallel machines means that parallel computing systems will have to expose, and load balance, several orders of magnitude more computation than currently available parallel machines. However, even current approaches often fail, as evidenced by the low utilizations of most large parallel machines.

SUMMARY

Systems and methods for providing a data structure, the distribution, which may be used to track the desired and/or actual locations of computations and data that range over a multidimensional iteration space (e.g., a rectangular index space) are disclosed. Examples of such iteration spaces include multidimensional arrays (e.g., multidimensional arrays supported by the Fortran or Fortress programming languages and having arbitrary indices) and counted loop nests. In various embodiments, these distribution data structures may be used in conjunction with locality-guided work stealing in systems that support work stealing.

In some embodiments, the use of distribution data structures may allow computations to be tied to array layout, and may allow iterations over subspaces of an index space to be performed in a manner consistent with the layout of the index space itself. For example, iterating over one half of an existing distributed array may by default occur on the processor(s) where that half of the array is allocated. In some embodiments, a common two-level layout may be used for all distributed arrays. Multiple arrays may be allocated such that they are aligned. In other words, smaller arrays may be aligned in memory alongside portions of larger arrays.

A distribution data structure may in some embodiments provide a structured mechanism to track load balancing decisions so that they can be reproduced in related computations, thus maintaining locality of reference. Such a data structure may provide a means for tracking locality information while providing load balancing based on work stealing, in some embodiments. Distribution data structures may also offer an opportunity to describe computations in a manner that is oblivious to precise machine size or structure.

BRIEF DESCRIPTION OF THE DRAWINGS

FIGS. 5-10 illustrate allocations of data and computations over multiple processors using distributions and generators, according to various embodiments.

Figure 1:
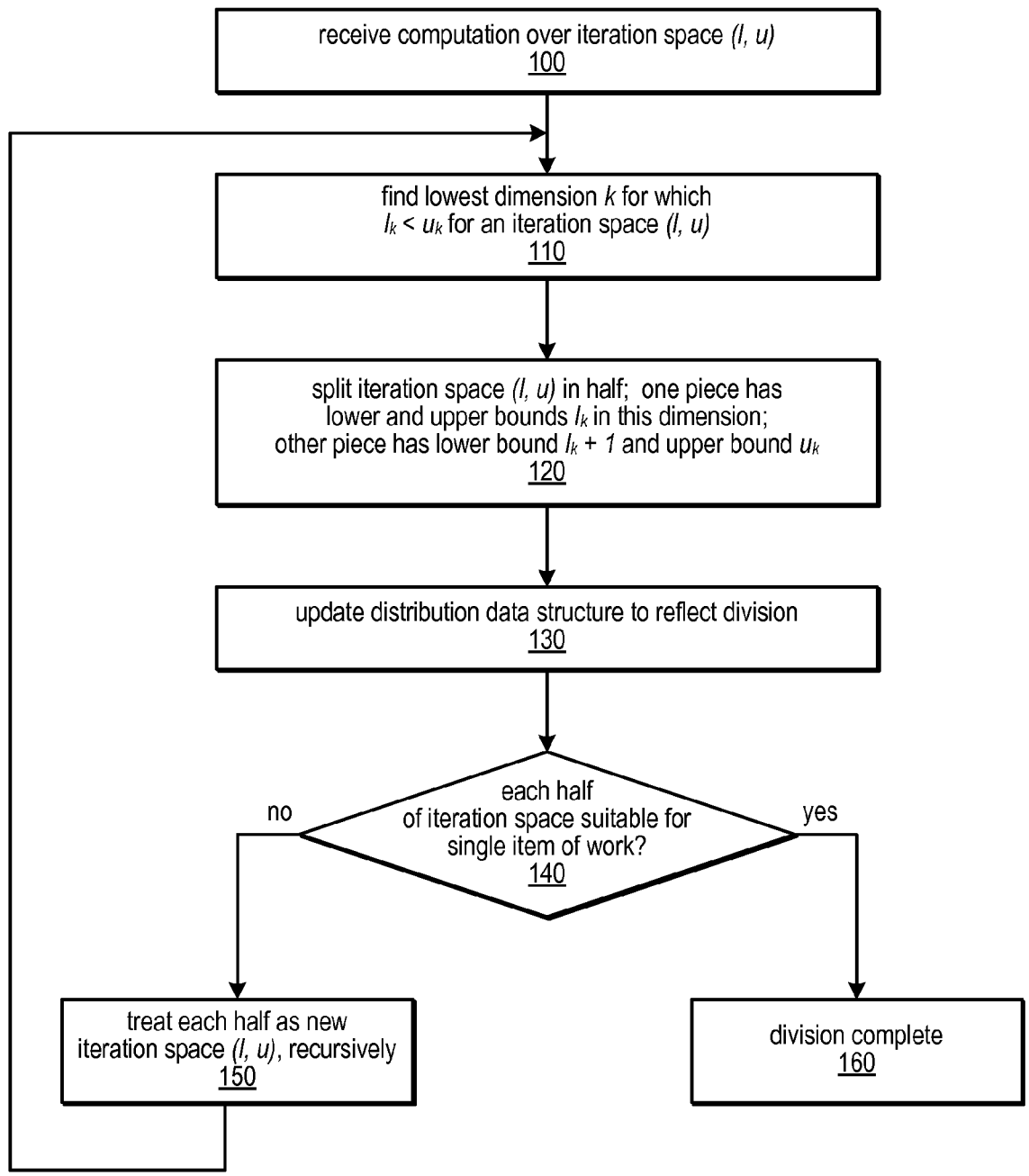
FIG. 1 is a flowchart illustrating a method for dividing an iteration space, according to one embodiment.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

As described above, parallel programming may increasingly involve a tradeoff between structuring a program around its communication and expressing the problem naturally in the hope of obtaining a reasonably efficient code that is adaptable and easily maintained. In various embodiments, programs may be developed in the latter style, and a communication structure may be imposed only when performance requires it. For example, the Fortress programming language, an open-source programming language initially developed by Sun Microsystems, Inc., was designed with this goal in mind. Distribution data structures, as described herein, may be implemented by library functions and/or other programs written in the Fortress programming language, in some embodiments. In other embodiments, they may be implemented using other programming languages (e.g., with or without extensions).

Distribution data structures may in some embodiments provide mechanisms to minimize data movement by localizing computations on common data. For example, in some embodiments a programming language and/or library design may allow a programmer to express the locality of data and/or computations. These data structures may be used in systems that provide dynamic load balancing, and may allow them to take advantage of locality information when it is available. Note that in various embodiments, such distribution data structures may be applied in parallel computing systems regardless of the underlying methods used to subdivide an iteration space for parallel execution.

Various programming language constructs and/or library functions may provide region, distribution, and/or generator functionality, as described in more detail herein. They may support distributed allocation of arrays, work stealing with fork/join parallelism, and locality-guided work stealing (e.g., via the use of mailboxes). In some embodiments, these programming language constructs and/or library functions may allow arbitrary distributions to be coded by the programmer, and may allow the programmer to explore the effects of various distributions and policy decisions on real programs.

Many programs written for parallel computing iterate over a relatively large iteration space, such as a multidimensional array or counted loop nest. These indexed iteration spaces, and/or computations on these arrays, may be carved up into pieces suitably sized for distribution across a machine using various currently available methods (e.g., for parallel execution on multiple processors, cores, and/or threads of the machine). Many of these large parallel machines use load balancing to attempt to increase utilization. In addition, there has been related research on work stealing, some of which has been applied in the design of the various multithreaded programming languages. For example, one group of researchers has developed space-efficient work stealing algorithms and has shown how to incorporate non-join synchronization. This research, performed in the course of implementing the NESL nested data-parallel programming language at Carnegie Mellon, proved that these work stealing algorithms achieve particular asymptotic time and space bounds. Several authors have examined the problem of locality-guided work stealing, and attempted to scale work-stealing algorithms to clusters. Other researchers have incorporated similar techniques in new memory allocators that better load-balance storage in multithreaded computations. However, previous techniques for locality-guided work stealing typically depended on prior knowledge of a machine's size and/or topology.

In order to best exploit work stealing, computations may be written in a divide- and conquer fashion. Consider, for example, the following dot product computation written in the C programming language:

```
for (i = 0; i <= entries; i++) {
    a[i] = b[i] * c[i]
}
```

This code may in some embodiments be translated into a work-stealing computation by turning it into a recursive divide-and-conquer function as follows:

```
dotProduct(lo, hi) =
    if (lo = = hi) {
        a[lo] = b[lo] · c[lo]
    } else {
        mid = (lo + hi) / 2
        fork {
            dotProduct(lo, mid)
        } and {
            dotProduct(mid+1, hi)
        }
    }
dotProduct(0, entries)
```

In this example, at each step in the recursion, the iteration space of the loop is split into two halves (resulting in a tree of computations), and the two halves may be spawned as work-stealing threads. Whenever possible, a pure work-stealing scheduler may run threads on the processor(s) on which they are spawned. These threads may typically be executed beginning with the most recently spawned (i.e., those that are deepest in the recursion tree). Using typical work-stealing algorithms, if a processor runs out of locally spawned threads, it may steal a thread from another processor chosen at random. The stolen thread may typically be the one shallowest in the recursion tree on the chosen processor. It may also be the oldest thread on that processor, and thus may be the last one that would have been run locally by that processor. More recently spawned threads may be left on the processor, guaranteeing a degree of temporal locality in scheduling. Such scheduling policies may in some embodiments be enforced by using a double-ended queue, or deque. For example, new threads may be pushed on top of the deque as they are spawned (e.g., by each fork) and the local processor may pop threads from the top of the deque, while work stealing may remove an element from the bottom of the deque. In a divide-and-conquer computation such as the one shown above, the stolen work may represent the largest piece of work that processor has yet to run. This may help ensure that work stealing is relatively rare, and may contribute to a goal of moving around units of work which are as large as possible, and which have the least temporal locality of the threads on a given processor.

The traditional method of work stealing described above may result in good temporal locality, but if a computation traverses a recursively divided iteration space, it may be desirable to perform portions of the computation on the same (or on a nearby) portion of the machine on which the corresponding portions of the data structure being traversed are located and/or to perform these computations in the same place each time the data structure is traversed. A system supporting locality-guided work stealing may add a low-level mechanism in an attempt to support these goals. This mechanism, a mailbox added to each processor, may in some embodiments be used to request that a given processor perform a particular computation. In such systems, when a thread is spawned it may be placed into the mailbox of the processor where it ought to be run, i.e., where the spawning thread determines that it ought to be run (e.g., based on the location of the data on which the computation is to be applied). Various policies may then be used to determine whether the threads in a processor's mailbox or those in its deque should be run first. For example, in some embodiments a policy may favor locally spawned (e.g., more recently spawned) work over work added to its mailbox (e.g., work for which the data is local). In other embodiments, a policy may specify that a processor run threads from its mailbox first, before attending to the threads that it has spawned itself. Traditional work stealing techniques may base their decisions about the mailboxes in which various pieces of work should be placed on decisions made in advance (e.g., in an ad hoc manner by the programmer) regarding how the iteration space (e.g., the data) should be subdivided.

Note that, in a system supporting work stealing, every thread may exist in two places: on the deque of a spawning processor, and in the mailbox of a destination processor. Therefore, in such embodiments, some mechanism may be used to guarantee that each thread is run exactly once. For example, a flag for each thread, set with a compare and swap, may in some embodiments be sufficient, but other techniques may be used in different embodiments. In other embodiments, work may be placed on either a mailbox or on the deque of the spawning processor, but not both. In such embodiments, a decision (e.g., based on a policy, such as those described above) may be made to determine which work items are placed in a mailbox and which are spawned.

In some embodiments, vast amounts of parallelism may be exposed. For example, one machine may include ten thousand CPUs, capable of spawning fifty threads each, plus additional resources to handle load balancing. Such a system may support the simultaneous execution of millions of threads. Therefore, fine-grained threading may need to be supported for efficient use of the machine's resources. In some embodiments, a shared address space may be created, but access to the shared space from distant nodes may be slow. Locality-guided work stealing may be used to adapt to load imbalance on a machine, while taking into account the allocation of data and/or computations to various nodes.

A common issue with parallel programming is that programmers typically are not aware of the number and/or the topology of available processors, and that number and/or topology may change during execution. For example, a large parallel machine may often include one or more nodes that are broken or otherwise unavailable. In some such machines, the number of threads executing on a given node may be reduced if its temperature rises. In others, various nodes may be taken off-line for maintenance or repair. In addition, the work load distributed to each node may be naturally non-uniform, with some being larger and/or slower to execute than others. Therefore, if the load on a given node drops, load balancing may be employed to put its extra computing capacity to work.

The distribution data structure and related techniques described herein may provide a systematic way to determine where computations should be allocated and/or moved (e.g., as a result of work stealing and/or load balancing). The distribution may indicate where data and associated computations will be allocated and may be updated to reflect any changes as a result of work stealing and/or load balancing. Therefore, subsequent instances of these computations (e.g., for another traversal of the iteration space) may be performed in the location at which they were actually performed, rather than in a location selected in advance (which may have changed). In various embodiments, programming language constructs and/or library functions may be used to implement the distribution data structures and related techniques, as described in more detail below.

Various models may be used to support parallel programming. For example, the "for" loop of various programming languages may be used to indicate parallel execution by default. In other embodiments, recursive subdivision may be used to divide an iteration space for parallel execution. In such embodiments, a scheduling mechanism may select the appropriate granularity at run time. Such mechanisms may adapt scheduling of thread to any changes in machine size during execution.

As noted above, the systems and methods described herein provide a distribution data structure that tracks the desired and/or actual location of computations and data that range over a multidimensional rectangular index space. Such distributions may be used to make subdivision decisions. For example, multidimensional arrays and counted loop nests may be subdivided according to such distributions, and the distributions may contain locality information for scheduling. As described herein, distribution data structures may in some embodiments be used in conjunction with locality-guided work stealing. The structure imposed by distributions may enable several significant refinements over ad hoc techniques for describing computational locality, including, but limited to:

Tying computations to array layout.

Always iterating over subspaces of an index space in a manner consistent with the layout of the index space itself. For example, iterating over one half of an existing distributed array will by default occur on the processors where that half of the array is allocated.

Using a common two-level layout for distributed arrays.

Allocating multiple arrays such that they are aligned; smaller arrays can be aligned in memory alongside portions of larger arrays.

Providing a structured way to track load-balancing decisions so they can be reproduced in related computations, thus maintaining locality of reference.

Offering an opportunity to describe computations in a manner that is oblivious to precise machine size or structure.

A distribution of dimensionality n describes divide-and-conquer computations on the space of n-dimensional integer vectors i, to be run on p processors. Such a vector may be referred to as an index, i.e., it represents an index into an array. In some embodiments, every array may have an associated distribution, and arrays that share a common distribution may share a common layout in memory.

A given array or loop nest covers a rectangular portion of the iteration space that is aligned with the axes. This may be referred to as the index space or the iteration space of the array or loop. An index space may be represented as a pair $\langle l,u \rangle$ of the lower and upper bounds of indices. For example, a three-dimensional array may have x indices ranging from −1 to 5, y indices ranging from 0 to 10, and z indices ranging from 3 to 17. The index space of this array would be [(−1, 0, 3), (5, 10, 17)]. Note that in some embodiments, $l_k \leq u_k$ for all components k of the lower and upper bounds. In other words, in some embodiments, it may be required that the index space meet this condition to be well-formed. An index i lies within an index space $\langle l,u \rangle$ if $l_k \leq i_k \leq u_k$ for all components k of the index. In this example, the indices lie within the rectangle whose lower corner is at (−1, 0, 3) and whose upper corner is at (5, 10, 17).

A distribution may in some embodiments be characterized by a dividing function d. Given an iteration space $\langle l,u \rangle$ that contains at least two indices, a dividing function d may return the following results:

$\langle l_1, u_1 \rangle$, the first piece of the index space (i.e., the first "half").

$\langle l_2, u_2 \rangle$, the second piece of the index space (i.e., the second "half").

A flag indicating whether these spaces should be operated on sequentially. If so, the first piece of work must be run before the second piece of work. For example, in some embodiments, a threshold may specify a lower bound on the size of a piece of the index space below which a piece of work may be considered small enough to be executed efficiently in a sequential manner.

A preferred placement (e.g., a processor number) $p_1$ and $p_2$ for each piece of work. A special value "Any" may be used to indicate that the computations may be placed anywhere. This placement information may be ignored by a sequential split (i.e., one for which the sequential flag is false).

The dividing function may specify a coordinate on one of the axes of the space at which the space should be divided. By using such a function to divide the space, the same solution may be obtained each time the function is called for the same region. This may in some embodiments result in reproducible behavior for splitting large arrays and small arrays in the same region (e.g., they may be split along the same planes). The dividing function may be called recursively on the pieces returned at each iteration, producing a tree structure that may be executed in parallel using a fork/join construct. In some embodiments, recursion may be performed until each piece is small enough to be allocated as a piece of contiguous memory that can be allocated to a particular processor.

In some embodiments, it may be required that every index i that lies within $\langle l,u \rangle$ must lie within exactly one of the two halves. In other words, the halves do not overlap and completely cover the original index space. The split point between the two halves may be identified by a dimension k and the components a, a+1 in that dimension that lie on either side of the split. The lower and upper bounds of the two halves may be identical to those of $\langle l,u \rangle$ in all other dimensions.

The flexibility of distributions may be captured in the dividing function, i.e., different dividing functions will yield different distributions. Given a starting index space $\langle l,u \rangle$ the dividing function d may be thought of as giving rise to a binary tree of index spaces, with $\langle l,u \rangle$ at the root, the first piece as the left child, and the second piece as the right child. These may be further subdivided by d in turn until, at the leaves, there are singleton index spaces.

As noted above, the dividing function d may divide space consistently, i.e., given any index space $\langle l,u \rangle$ and any index space $\langle l',u' \rangle$ contained within it, when $\langle l,u \rangle$ is split, then $\langle l', u' \rangle$ may lie completely within one of the halves of the split, or it may be the case that each piece of splitting $\langle l',u' \rangle$ lies completely within the corresponding piece of $\langle l,u \rangle$. In other words, in some embodiments, $\langle l',u' \rangle$ may be subdivided in the same dimension k between the same components a, a+1, and the two halves may be ordered in the same way. If this dividing line lies outside $\langle l',u' \rangle$ then it may not be subdivided. Preferred placements may also be required to occur consistently. In the example described above in which $\langle l',u' \rangle$ is split such that each piece of $\langle l',u' \rangle$ lies within one of the split portions of $\langle l,u \rangle$, it may be assumed that the preferred location of each piece of $\langle l',u' \rangle$ is the same as the preferred location of the corresponding portion of $\langle l,u \rangle$.

A simple example of a dividing function is a row-major dividing function. One method for dividing an iteration space using a row-major dividing function is illustrated by the flow chart in FIG. 1. In this example, a computation over an iteration space $\langle l,u \rangle$ is received, as in 100. Given $\langle l,u \rangle$, the method includes finding the lowest dimension k for which $l_k < u_k$, as in 110. The iteration space is then split in half according to the dimension k, as in 120. In this example, the left piece will have lower and upper bounds $l_k$ in this dimension, and the right piece will have lower bound $l_{k+1}$ and upper bound $u_k$. The data structure representing the distribution will be updated to reflect this division, as shown in 130.

If each half of the iteration space is suitably sized for a single item of work, shown as the positive exit from 140, the division is complete, as in 160. Otherwise, shown as the negative exit from 140, each half is treated as a new iteration space $\langle l,u \rangle$, and the division is repeated for each half, recursively, shown in FIG. 1 as 150 and the feedback loop to 110. In this example, the subdivision may be treated as sequential, i.e., the division function may return a true value for the sequential parameter and each item of work may be executed sequentially on the individual subdivisions of suitably small size.

Applying a row-major subdivision to the example above, the iteration space may first be split into $\langle (-1,0,3),(-1,10,17) \rangle$ and $\langle (0,0,3),(5,10,17) \rangle$, then each half may be split into two halves, and so on, until the iteration space is divided into spaces suitable for a single item of work. The overall effect of this subdivision method may be similar to that resulting from the following loop nest:

```
for (i = -1; i <= 5; i++)
    for (j = 0; j <= 10; j++)
        for (k = 3; k <= 17; k++)
            do work on (i, j, k)
```

Figure 2:
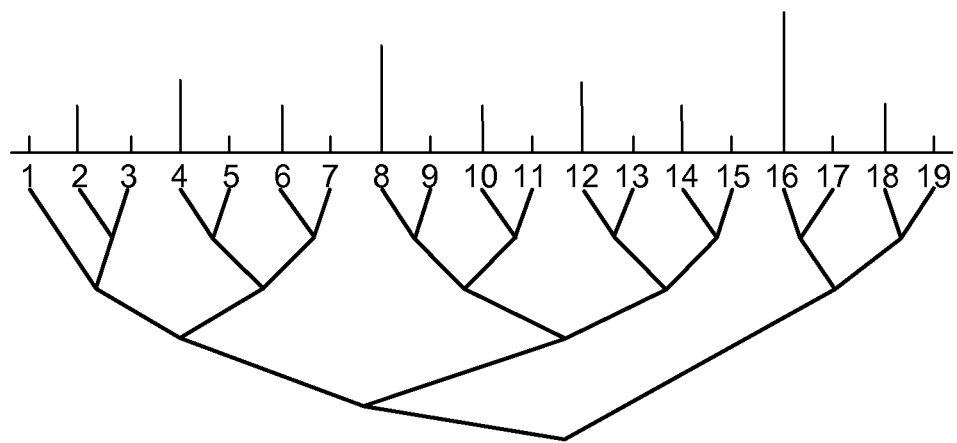
FIG. 2 illustrates the use of ruler subdivision, according to one embodiment.

Another parallel dividing function that may be applied to various iteration spaces is the ruler dividing function. Given $\langle l,u \rangle$, the ruler dividing function may be used to split the lowest dimension k that contains both −1 and 0, if any. Otherwise, the dimension that contains the indices $2^n-1$ and $2^n$ with the largest values of n may be split. In this example, in case of a tie, the lowest dimension may be split. The resulting distribution may be a generalization of Morton ordering, a cache-oblivious layout and traversal order for large arrays. A one-dimensional case application of ruler division is illustrated in FIG. 2. In this example, the ruler subdivision technique is applied to an iteration space $\langle 1,19 \rangle$. In this example, the first subdivision occurs at 16, the second at 8, the third at 4 and 12, and so on.

As described above, a distribution may give rise to a binary tree that describes the subdivision of a particular subspace. In various embodiments, such a tree may not need to be balanced, but may be required to have a regular structure. The nodes of the tree may be annotated with locality information, which may be updated as a result of load balancing and/or locality-guided work stealing. The distribution data structure may be encoded in various manners in different embodiments. For example, in one embodiment, it may be implemented as an array of pointers to each of the pieces of work, and this array may be traversed as a tree structure that matches the subdivisions of iteration space.

Given a data structure that reflects how the iteration space is subdivided, there may be different approaches to mapping the subdivided space to the portions of the machine on which corresponding computations should be executed, in different embodiments. In one embodiment, the data structure may be initialized to indicate processor allocations using fixed values in advance, i.e., based on how the programmer thinks the data should be laid out on the machine. In some embodiments, such an initial allocation may be based on a standard distribution technique, such as a blocked or blocked-cyclic distribution. If the data structure is used as initialized, and is not updated, this may result in a fixed distribution on the machine that is followed each time the iteration space is traversed.

In another embodiment, the data structure may be initialized to indicate processor allocations, as above, assuming that no load balancing or work stealing will occur. However, the data structure may be adapted as load balancing and/or work stealing take place during execution. For example, in systems that support load balancing and/or work stealing and that include a mailbox, as described above, each processor may perform work locally from three possible sources: work that was created locally, work that was stolen from another processor, and work that was posted to the processor's mailbox by another processor. If work that was originally allocated to a given processor is actually performed by another (either by being stolen or posted to that processor's mailbox), the distribution data structure may be updated to reflect the actual processor on which it was performed. In some embodiments, when that piece of work is encountered again (e.g., when the iteration space is subsequently traversed), the updated data structure may direct the piece of work to the processor on which it was actually performed, not to the processor to which it was initially allocated.

In yet another embodiment, the distribution data structure may not be initialized with processor allocations in advance at all, but may record the location at which each piece of work is performed after load balancing has been used to initially allocate the work. In such embodiments, the data structure may also be updated to reflect any changes to those allocations based on work stealing and/or subsequent load balancing (e.g., in the case that load balancing results in a subsequent traversal of the iteration space result in a different solution based on changes in the machine or work load). In various embodiments, any of the approaches described above may be applicable in a given computing system and/or for a given parallel programming application. For example, the selection of one of these approaches (or another approach) may be influenced by the nature of the problem (computation) to be solved, the size and/or complexity of the iteration space, and/or the size and/or topology of the machine on which it is to be executed.

Using a distribution to perform iteration is a fairly simple matter. Assume we wish to loop over the index space $\langle l,u \rangle$, running the function $f$ on each index. Given d as described above this is a simple matter:

```
run_f(⟨l,u⟩) =
    if l = u {      // base case: singleton index space
        f(l)
        return
    }
    // non-singleton index space. Subdivide.
    ⟨⟨l1,u1⟩⟨l2,u2⟩,sequential,p1,p2⟩ = d(⟨l,u⟩)
    if sequential {
        run_f(⟨l1,u1⟩)
        run_f(⟨l2,u2⟩)
    } else {
        fork on p1 {
            run_f(⟨l1,u1⟩)
        } and on p2 {
            run_f(⟨l2,u2⟩)
        }
    }
```

Figure 3:
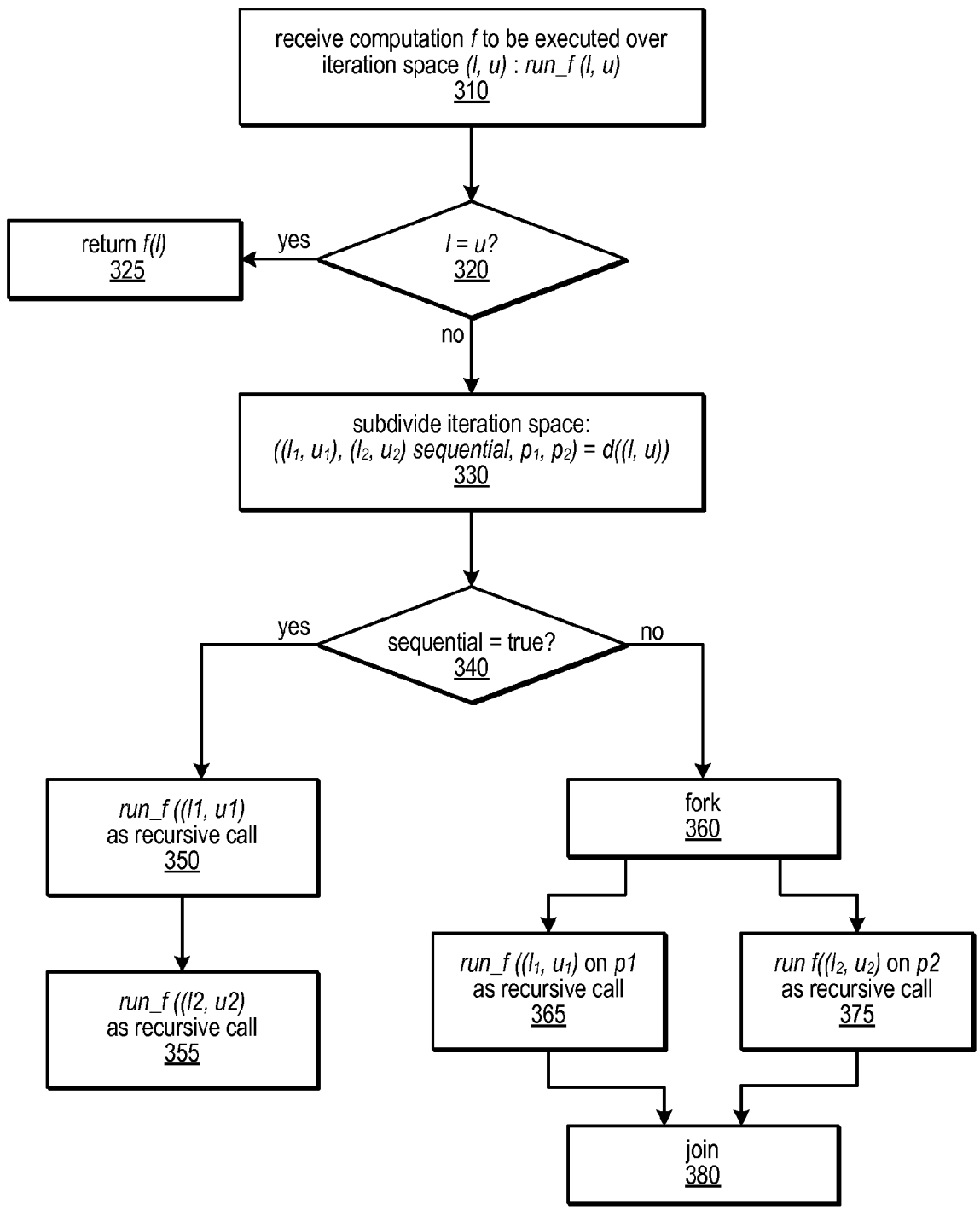
FIG. 3 illustrates a method for using a distribution to perform iteration, according to one embodiment.

The use of a distribution in performing a computation over an iteration space, as described above, may be further illustrated using the flow chart in FIG. 3. In this example, a computation $f$ to be executed over an iteration space $\langle l,u \rangle$ is received, as in 310. The function $f$ is called using the method run_$f$, which takes the bounds of iteration space $\langle l,u \rangle$ as input. If l is equal to u, shown as the positive exit from 320, this represents the singleton index space, i.e., an index space that cannot be further subdivided and/or that represents an index space suitably sized for application of the function $f$ as a single item of work. This is shown in 325 as the return of the result of the function $f$ applied to index l.

If, on the other hand, l is not equal to u, shown as the negative exit from 320, the iteration space may be divided, as in 330. In this example, the dividing function is applied to the iteration space and returns two sub-spaces, the value of the sequential parameter, and identifiers of respective processors on which the function $f$ may be applied to each half of the iteration space may be executed. If the sequential parameter value indicates that the two computations should be applied sequentially, shown as the positive exit from 340, the method may repeat recursively for each half of the iteration space in sequence. This is shown as a first recursive call to run_$f$ in 350 and a second recursive call to run_$f$ in 355.

If the sequential parameter value indicates that the two computations should be applied in parallel, shown as the negative exit from 340, the method may include a fork/join pair (shown as 360/380). In this case, the function $f$ may be applied recursively to the two halves of the iteration space in parallel on respective processors $p_1$ and $P_2$. This is shown as parallel calls to run_$f$ in 365 and 375 of FIG. 3.

Representing an array, however, may be more complex. One technique for doing so may be to allocate a binary tree whose structure reflects the structure of the subdivision performed by d. This may be done in parallel using code similar to that shown above. However, this representation may not, in general, admit fast indexing, a feature of arrays that distinguishes them from trees and maps.

An alternate representation of a distributed array that may be suitable for such an application is as a two-level structure (i.e., an array of arrays). For example, a first-level structure may be an array of pointers to sub-arrays. In some embodiments, each element of this first-level structure may be written once as the array is initialized, and may remain unchanged thereafter. On a large machine, this first level may, therefore, be replicated in multiple locations. In some embodiments, the second level may be a series of independent "chunks". Each chunk may be a sub-array that is allocated in a particular location on the machine and these chunks may contain the actual array data.

In order to utilize a two-level structure, the subdivision function d may be augmented with two new functions. The first may be a function ix which, given an index space $\langle l,u \rangle$ and an index i within that index space, may return a pair of integers indicating the index into the top-level array and the sub-array it contains where array index i may be found. The second may be a function a which, given an index space $\langle l,u \rangle$ may return the size of the topmost level of the two-level array structure required to represent it. In some embodiments, a restriction that may be applied to such structures is that when $a(\langle l,u \rangle > 1 a \rangle l,u \rangle = a\langle l_1,u_1 \rangle + a\langle l_2,u_2 \rangle$. When $a(\langle l_i,u_i \rangle) = 1$, ix($\langle l,u \rangle$, n) for every n in $\langle l_i,u_i \rangle$ may yield the same offset in the top-level array. Furthermore, every computation in $\langle l_i,u_i \rangle$ may request the same processor. The number of entries in this sub-array may be equal to the size of the largest subdivision of $\langle l,u \rangle$ according to d for which a is 1 and which contains $\langle l_i,u_i \rangle$. In some embodiments, the entries in the top-level array must follow the structure of the subdivision specified by d. For example, for the tree that subdivides $\langle l,u \rangle$, a line may be drawn across this tree representing the point at which sub-arrays will be allocated. The example code below may be used to allocate a zero-filled array according to this scheme. In this example, it is assumed that allocation occurs on whichever node runs an allocation call.

```
Array(⟨l,u⟩) =
    result = allocate firstlevel(a⟨l,u⟩)
    result.distribution = ⟨d,a,i⟩
    result.bounds = ⟨l,u⟩
    fill_in(result,⟨l,u⟩)
    return result fill_in(toplevel,⟨l,u⟩) =
    if a⟨l,u⟩= 1 {      // base case: allocate second level
        second = allocate secondlevel(indexspace size⟨l,u⟩)
        (topoffset, -) = ix(toplevel.bounds, l)
        result[topoffset] = second
        return
    }
    // Multiple second-level arrays to allocate
    ⟨⟨l1,u1⟩,⟨l2,u2⟩,sequential,p1,p2⟩ = d(⟨l,u⟩)
    if sequential {
        fill_in⟨l1,u1⟩
        fill_in⟨l2,u2⟩
    } else {
        fork on p1 {
            fill_in⟨l1⟩
        } and on p2 {
            fill_in⟨l2,u2⟩
        }
    }
}
```

In the example above, $\langle l_1,u_1 \rangle$ and $\langle l_2,u_2 \rangle$ correspond to the results of the subdivision of $\langle l,u \rangle$, shown in the code as $d(\langle l,u \rangle)$.

Figure 4:
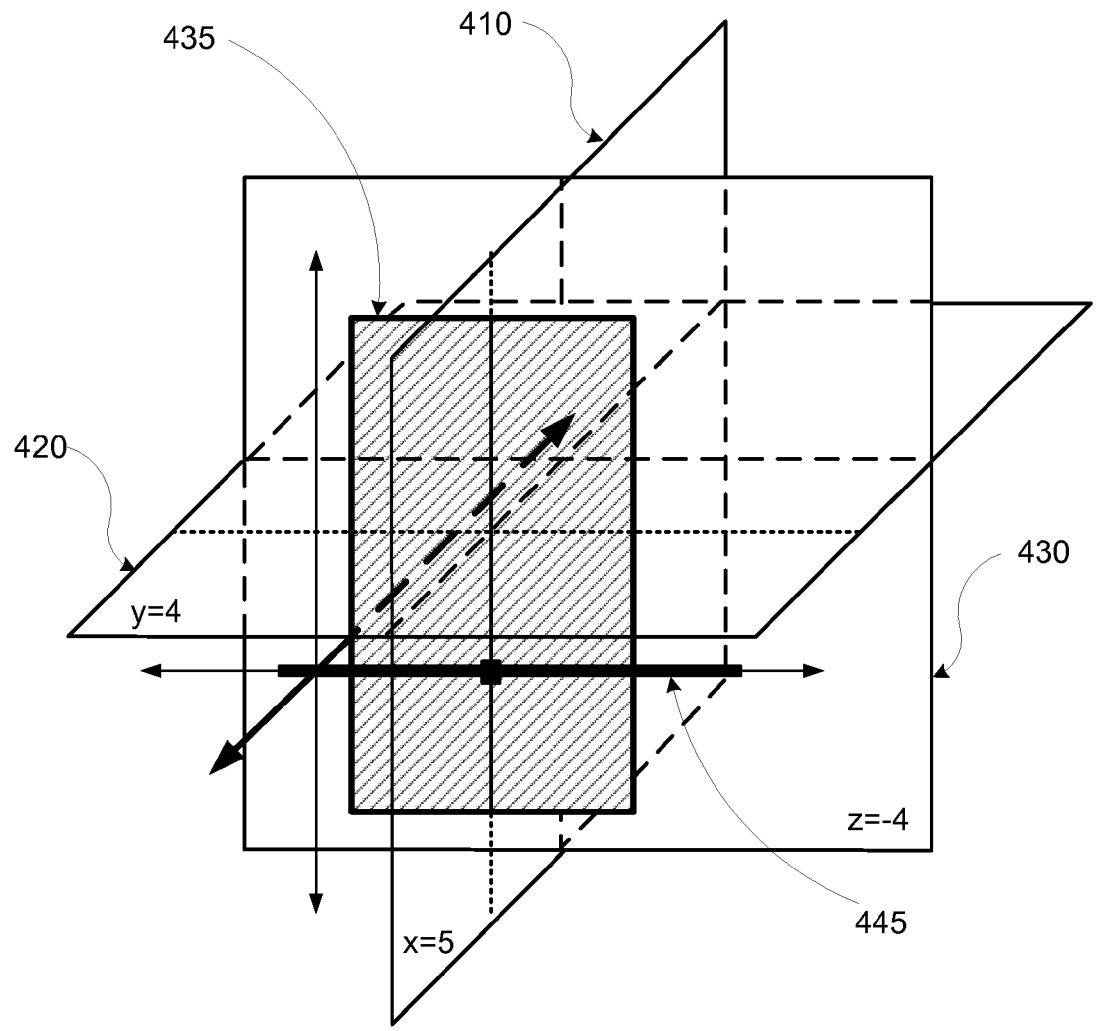
FIG. 4 illustrates reduction of dimensionality for a three-dimensional distribution, according to one embodiment.

In some embodiments, functions may be written to construct one distribution from another, in effect creating a wrapper around the underlying distribution. For example, the indices of a distribution may be permuted to turn a row-major array into a column-major one or vice versa. One useful wrapping operation is an operation to reduce dimensionality. For example, a one-dimensional and/or a two-dimensional array may be allocated in a three-dimensional distribution using a reduction operation. Such an operation may pad every index with zeroes in the remaining dimensions. An example of reducing dimensionality is illustrated in FIG. 4, according to one embodiment. In this example, a two-dimensional array 435 and a one-dimensional array 445 are embedded in a three-dimensional distribution represented by planes 410, 420, and 430. These three planes correspond, respectively, to an iterative space having a lower bound in which x=5, y=4, and z=−4.

In some embodiments, distributions of very large (or even unbounded) dimensionality may be created, and reduction of dimensionality may occur automatically whenever lower-dimensionality spaces are operated on. In other words, distributions may be used to describe subdivision of infinite-dimensional space (or at least space with an arbitrarily large number of dimensions). These spaces may in some embodiments be cut by a sequence of planes, each orthogonal to an axis of the space, and arrays and iteration spaces may reside in the lowest dimensions of the space. For example, a one-dimensional array may be split at one point, and then each half may be split at other points, and so one. Similarly, a two-dimensional array may be split first by a horizontal or vertical line, and then split again by a line orthogonal to the first split line, and so on. In this way, each half of the space (after a given split) may be split in the same place by the next split. A three-dimensional space, such as that illustrated in FIG. 4, may be split using planes that are parallel to its three axes.

Another useful wrapping operation may involve serialization. With serialization, for a given distribution, every split may be made sequential. This may in some embodiments be useful for performing sequential computations on an otherwise-parallel distribution.

In various embodiments, a solution to a distributed computation may include three types of components. One type of component may describe machine resources on which the computation may be distributed. These are referred to herein as the regions of the solution. Regions may in some embodiments be used to describe the hierarchical structure of a machine (e.g., each node may be a region). In one example, a tree may used to represent the regions of a machine, and may include the entire machine at its root, groups of processors at the second level, individual processors at a third level, and cores or threads at the lowest level of the tree. One such tree, which may support a least upper bound, is described in more detail below. However, a tree structure may not be able to describe all architectures (e.g., a grid layout). Another component, which may be used in allocating data, is referred to herein as a distribution or a distribution data structure. In some embodiments, the solution may also include one or more generators, which may be used in distributing computations.

Several examples of distributions and generators are illustrated in FIGS. 5-10. The distribution data structures and generators described herein may in some embodiments be supported by built-in constructs of a programming language, or by extensions thereto. In one embodiment, code sequences, written in accordance with the Fortress language specification (version 1.0), may be used to allocate data and/or computations using various built-in language constructs and/or library functions. For example, the following code may be used to spawn threads t1 and t2, according to the Fortress syntax:

t1=spawn e1
t2=spawn e2

Similarly, the following code may be used to invoke the val methods the spawned threads, which return the value of the sub-expressions computed by each of the spawned threads:

a1=t1.val( )
a2=t1.val( )

According to the Fortress syntax, an example of code used to implement a for loop iteration is shown below:

```
for x ← 1#1000 do
    a[x] := x
end
```

The code above may be used to fill a one-dimensional array having 1000 entries with values equal to the index of each entry. The example code above uses primitive language construction to indicate that operations to be executed in parallel.

Another example of code used to implement a for loop iteration, this time iterating over multiple arrays, is shown below:

```
for i ← 1#1000 do
    a[i] := a[i] + b[i]
end
for i ← 1#1000 do
    a[i] := a[i] / c[i]
end
```

Again, this code uses primitive language constructs to indicate that the expressions may be evaluated in parallel. For this example code, opportunities for exploiting locality may include co-locating chunks of arrays a, b, and c:

a=d.array(1, 1000)
b=d.array(1, 1000)
c=d.array(1, 1000)

Another opportunity for exploiting locality may include co-locating iterations of the for loops. Note that in this example, both loops manipulate the same array a.

The allocation of data and/or computations described above may be further illustrated by the allocation examples depicted in FIGS. 5-10. FIG. 5 illustrates one example of a distribution used for allocating data. As illustrated in FIG. 5, the distribution may have two tasks: dividing the iteration space into chunks, and mapping the chunks of the iteration space to regions. FIG. 5 illustrates the mapping of various iteration space chunks to six processors (CPU1-CPU6).

As described herein, a computation may iterate over a space represented by an array, and that array be divided into sub-arrays for parallel execution. FIG. 6 illustrates the allocation of two such sub-arrays for the iteration space illustrated in FIG. 5. In this example, array a is bounded by a thick solid line and array b is bounded by a thick dashed line. The allocations of the arrays from an iteration space d.array ⟨1,u⟩ are performed using a dividing function d as follows:

a:=d.array((0,0), (8,8))
b:=d.array((2,3), (9,10))

As noted above, in various embodiments, generators may be used to distribute computations. FIG. 7 illustrates the use of one such generator, according to one embodiment. Note that generators may in some embodiments be thought of as the parallel equivalent of iterators. In the example illustrated in FIG. 7, a generator may be used to divide computations for iterating over a bounded portion of a distribution. The bounded portion shown by the thick solid line in FIG. 7 corresponds to array a, described above. To produce a generator for array a, the following code may be used:

g=a.indices( )

FIG. 8 illustrates that in this example, the bounded portion (i.e., array a) may be split by planes defined in the distribution for parallel execution. FIG. 8 illustrates the division of array a into a left half and a right half, each with its own generator. FIG. 9 illustrates that each half may be further split in half, each with its own generator. In this example, individual generators are indicated as corresponding to the bottom (or "right") halves of each of the left and right halves shown in FIG. 8.

Finally, computations may be placed by co-locating them with data, e.g., using a common distribution. In some embodiments, computations may be placed by finding the region of each data chunk, e.g., by using a corresponding generator's region( ) method. To place a computation on a specific region of the machine, the corresponding spawn operation (e.g., according to the Fortress syntax) may be augmented to include the specification of a region r, as shown below:

spawn at r do e1 end

FIG. 10 illustrates that the region method of the generator for the "left, right" portion of array a indicates that corresponding computations should be placed on CPU4, in this example.

As previously noted, distribution data structures and generators, such as those described above, may in some embodiments be supported by built-in constructs of a programming language, or by extensions thereto. Other examples of code employing such constructs are shown below. The first example illustrates the use of generators and for loops:

```
For( i, j ) ← a.indices( ) do
    a[i, j] := i + j
end
```

In the example above, an a.indices( ) generator is used to split the computation into parallel pieces (e.g., replacing the explicit loop index used previously), and a regions method of the a.indices( ) generator may be used to spawn the parallel pieces on respective regions containing chunks of array a. Similarly, the example code below replaces an explicit loop index with a generator for splitting the computation into parallel pieces.

```
for i ← a.indices( ) do
    a[i] := a[i] + b[i]
end
for i ← a.indices( ) do
    a[i] := a[i] / c[i]
end
```

In some embodiments, a computing system configured to execute such parallel code may employ work stealing, as described above. For example, in one embodiment, one worker thread may run on each CPU and may maintain a task deque. The worker thread may execute tasks from its task deque and spawn expressions may push tasks onto the CPU's local deque. In traditional work stealing, when a CPU's local deque is empty, the worker thread may steal a task from another (e.g., a random) worker thread. Such a mechanism may provide for dynamic load balancing, as described above. However, this mechanism may push new tasks onto a local deque ignoring an indication of the region passed to the spawn expression. Therefore, even if a computation is placed on the right deque, it may be stolen and not executed on the CPU for which it was intended. In other words, dynamic load balancing is often at odds with locality, with a tradeoff between moving computations to idle processors vs. co-locating computations with their target data. As described above, locality-guided work stealing may support locality via mailboxes, in some embodiments. In such embodiments, each worker thread may have a mailbox queue in addition to a task queue. When adding a task to local task queue, the task may also be added to the mailbox indicated by the region specified in the spawn expression. In such embodiments, an idle worker thread may check the mailbox queue before stealing a task. Some embodiments may further support locality by attempting to keep stealing "local", e.g., within the same region or on the same node.

As note above, locality-guided work stealing is designed to adapt to load imbalance on a machine. A consequence is that computations may not always run where the distribution requests that they be run. In some embodiments, it may be desirable to preserve decisions made by the scheduler. Therefore, such embodiment may provide a way for the scheduler to communicate scheduling decisions to the distribution code. For example, in some embodiments, when a thread is forked, the address of an object field may be passed in, and this object field may be updated with the location where computation is actually run.

In some embodiments, the effect of scheduling decisions may be captured in a tree which is stored as part of the distribution. In such embodiments, each node of the tree may be labeled with an index space and a processor. The two children of each node may be the result of the split of the index space. The root of the tree may be an index space that contains every index space that has ever been iterated over. When a computation is to iterate over an index space ⟨l,u⟩, this tree may be walked until reaching a node whose children do not completely contain ⟨l,u⟩. The computation for ⟨l,u⟩ may then be spawned on the processor indicated by the node and the node may be updated with the processor on which the computation is actually run. In this example, the children of ⟨l,u⟩ when it is split will be descendents of this node.

In this example, if the root of the tree does not completely contain ⟨l,u⟩ when an attempt is made to run the computation, an index space which completely contains both the current root and ⟨l,u⟩ may need to be identified. This new enlarged index space may be divided. If the old root is not completely contained in one of the pieces, the root may be relabeled with the new index space, and a similar check may be performed for the pieces of the newly split root and the children of the root note. Otherwise, a new root may be allocated, and an attempt may be made to merge the old root with the piece that completely contains it. In this example, the tree may essentially grow to accommodate overlapping index spaces, but may preserve the processor information that has already been obtained.

In general, there may be a large space of strategies for determining when locality information should be updated. For example, in some embodiments, locality information may be computed only occasionally, e.g., at startup, when objects are allocated, when a certain number of nodes are stolen and run in a different location, and so forth. All these strategies may use variants of the tree-based structure described herein to store the ultimate decisions that are made. This may provide a common infrastructure for scheduling decisions. In other words, the particular policies used may be factored out of the solution for preserving those decisions.

Figure 11:
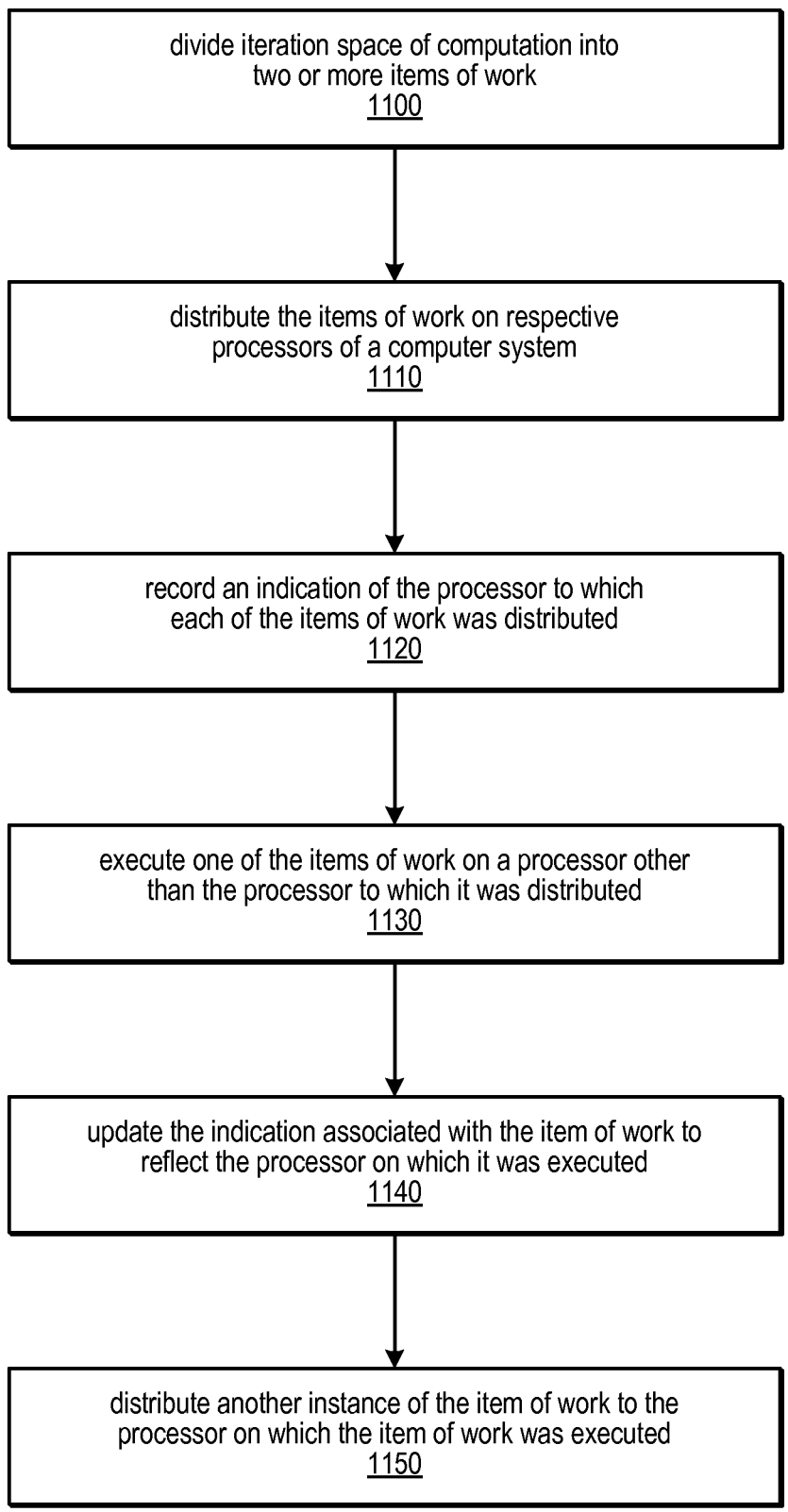
FIG. 11 is a flowchart illustrating a method for using a distribution data structure in locality-guided work stealing, according to one embodiment.

One method of using a distribution data structure in locality-guided work stealing is illustrated by the flow chart in FIG. 11. In this example, an iteration space of a given computation is divided into two or more items of work, as in 1100. The iteration space may be divided using any of the methods described herein, or using other methods, according to various embodiments. The items of work may be distributed on respective processors of a computer system, as in 1110, using any of various methods for the initial mapping. For example, in one embodiment, the items of work may be co-located with corresponding chunks of data on which they are to be applied, as described above. In other embodiments, the items of work may be distributed according to a load balancing algorithm or policy, or an initial mapping of work items may be specified or suggested by the programmer. As shown in 1120 of FIG. 11, the method may include recording an indication of the processor to which each of the items of work was distributed. For example, a distribution data structure may be used to store an indication of an assigned processor to each chunk of the iteration space according to the initial mapping.

As illustrated in FIG. 11, during execution of the distributed computation, one of the items of work may be executed on a processor other than the processor to which it was initially distributed, as in 1130. For example, the item of work may be placed in the mailbox of another processor by the processor to which it was originally assigned, or it may be stolen by a processor that has completed the work in its mailbox and/or its locally-spawned work. In this example, the method may include updating the indication associated with the item of work to reflect the actual processor on which it was executed. For example, the distribution data structure may be updated after an item of work has been stolen, or otherwise reassigned, and executed. This is shown as 1140. As discussed above, the next time an instance of this item of work is presented to the system, it may be distributed to the processor on which the previous instance was executed, according to the updated distribution data structure. In other words, the distributed data structure may be used to store an indication of the processors actually used to execute each item of work and to assign those same items of work to the same processors whenever they are presented. This is shown as 1150.

Figure 12:
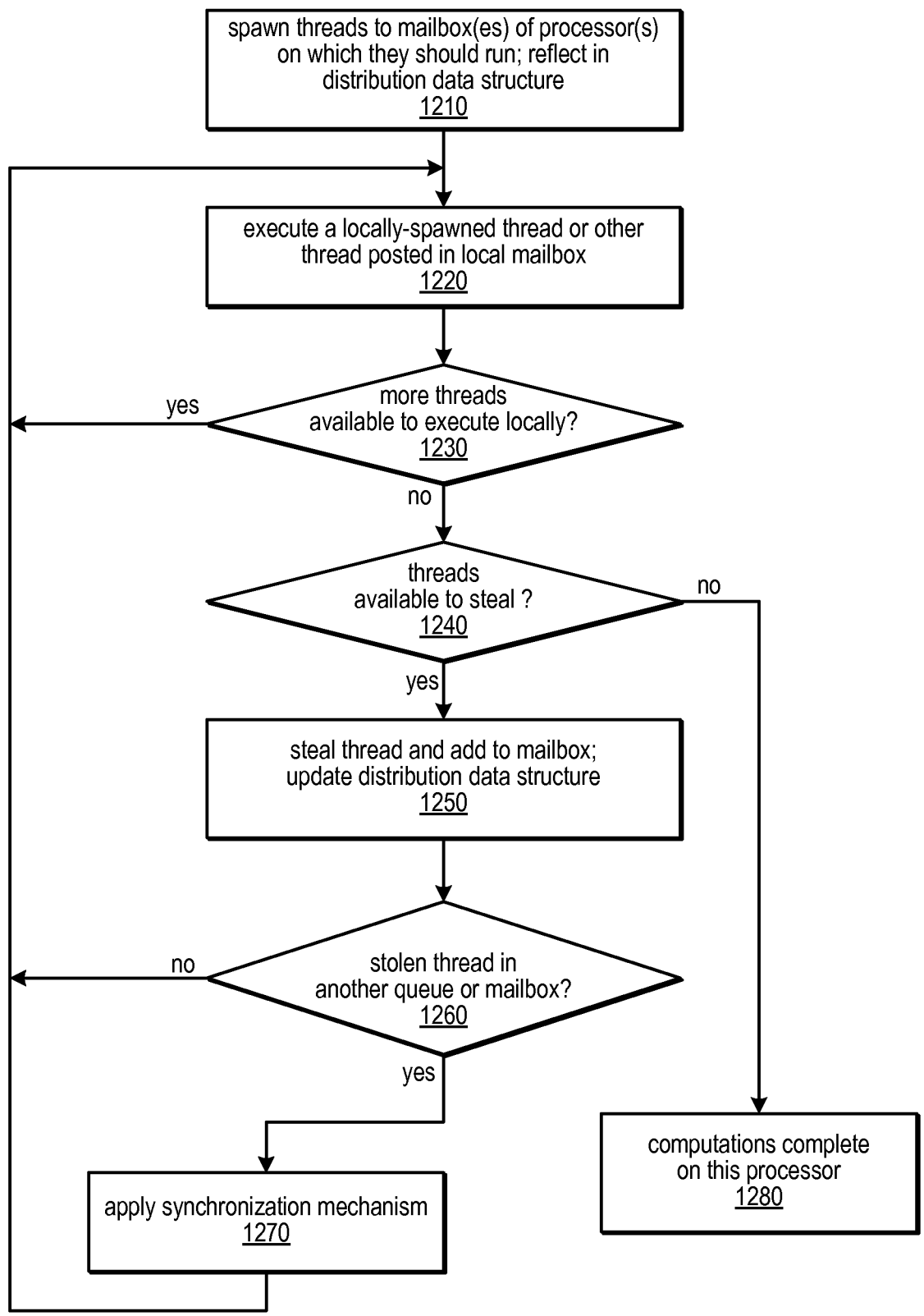
FIG. 12 is a flowchart illustrating a method for distributing threads using locality-guided work stealing, according to one embodiment.

As previously noted, when an item of work is stolen from another processor, it may, at least temporarily, be included in two places in the distribution data structure at once. Therefore, in some embodiments, a synchronization mechanism may be applied so that each item of work appears in only one location. FIG. 12 is a flowchart illustrating a method for distributing threads using locality-guided work stealing that includes such a mechanism, according to one embodiment. In this example, various threads are spawned to the mailboxes of a plurality of processors for a given computation, as in 1210. Each thread is spawned to the mailbox of a processor on which it is targeted to be executed, according to an initial mapping and as reflected in a distribution data structure for the iteration space of the computation.

In this example, a given processor (which may be the processor that spawned the threads in 1210) may execute a locally-spawned thread or another thread posted in its local mailbox (e.g., by another processor). This is shown in 1220. If there are more threads available in the queue or mailbox of the processor, shown as the positive exit from 1230, the method may include execute those threads, shown by the feedback loop to 1220. If there are no more threads available, shown as the negative exit from 1230, the method may include determining if there are threads available to steal, as in 1240. If there are no threads available to steal from other processors, shown as the negative exit from 1240, the computations may be complete on the given processor, as in 1280.

If there are threads available to steal, shown as the positive exit from 1240, the method may include stealing a thread and adding it to the processor's mailbox, as in 1250. The distribution data structure may be updated to reflect that the processor has stolen the thread, as shown. If the stolen thread was also included in another queue or mailbox (e.g., if had previously been stolen by another thread, but had not yet been executed), shown as the positive exit from 1260, the method may include applying a synchronization mechanism, as in 1270. For example, transactional memory may in some embodiments simplify synchronization, by allowing atomic operations to be used to update distribution data structures and/or deques. However, in some embodiments, efficient bulk synchronization operations may still be needed. The method may then continue by executing the stolen thread, shown as the feedback loop to 1220. Note that in other embodiments, work stolen from another thread may not be placed in the processor's local mailbox (as in 1250) before being worked on. Instead, work may begin on the stolen thread immediately after it is stolen. In such embodiments, a synchronization mechanism may still be applied, as shown.

The description of the dividing function d, above, did not explain in detail how processor placement might be computed. However, in some embodiments, the same mapping must be used regardless of how large an iteration space is used and how many processors are available. Using the techniques described above, processor-oblivious distributions may be created. In some embodiments, the distribution may initially return the value "Any" for all divisions. In such embodiments, the processor information captured may be used to provide subsequent layout information.

In some embodiments, machine configuration information and distribution usage may be established in advance. In such embodiments, a distribution may be constructed which uses this information to determine appropriate processor assignments in advance. In one embodiment, this information may be used to construct the tree described above, and subsequent computations may be allowed to run adaptively. In one embodiment, a strategy may be to compute locality information only when the distribution returns "Any". This may permit a distribution to use a mix of static and dynamic scheduling, for example, to statically schedule certain core regions of a distribution while relying on dynamic placement for other (e.g., less-important) areas.

A more elaborate version of locality-guided work stealing may take machine structure into account, e.g., by stealing work preferentially from nearby processors. For example, in some embodiments it may be possible to specify that work should occur in a particular region of a machine. In such embodiments, there may be a mechanism to name machine regions, and a mechanism to place a computation in a particular region. The first mechanism is machine dependent, though it may be useful to view the machine as a tree-structured hierarchy of regions, with "Any" at the top. There are several possible variations of locality-guided work stealing that may be used to place computations on a particular region of the machine, including, but not limited to:

Random placement, in which a processor is chosen at random from the region, and the computation is placed in the mailbox of that processor.

Hierarchical mailboxes, which provide a separate mailbox for each machine region. A processor may check this mailbox when the work on its deque lies outside the region (that is, when it posts work to a mailbox outside the region).

Hierarchical mailbox structures may make particular sense on multi-strand multi-core machines, where multiple threads share various levels of the cache hierarchy. For example, in one embodiment there might only need to be a single mailbox for all the strands that share a single L1 cache.

Figure 13:
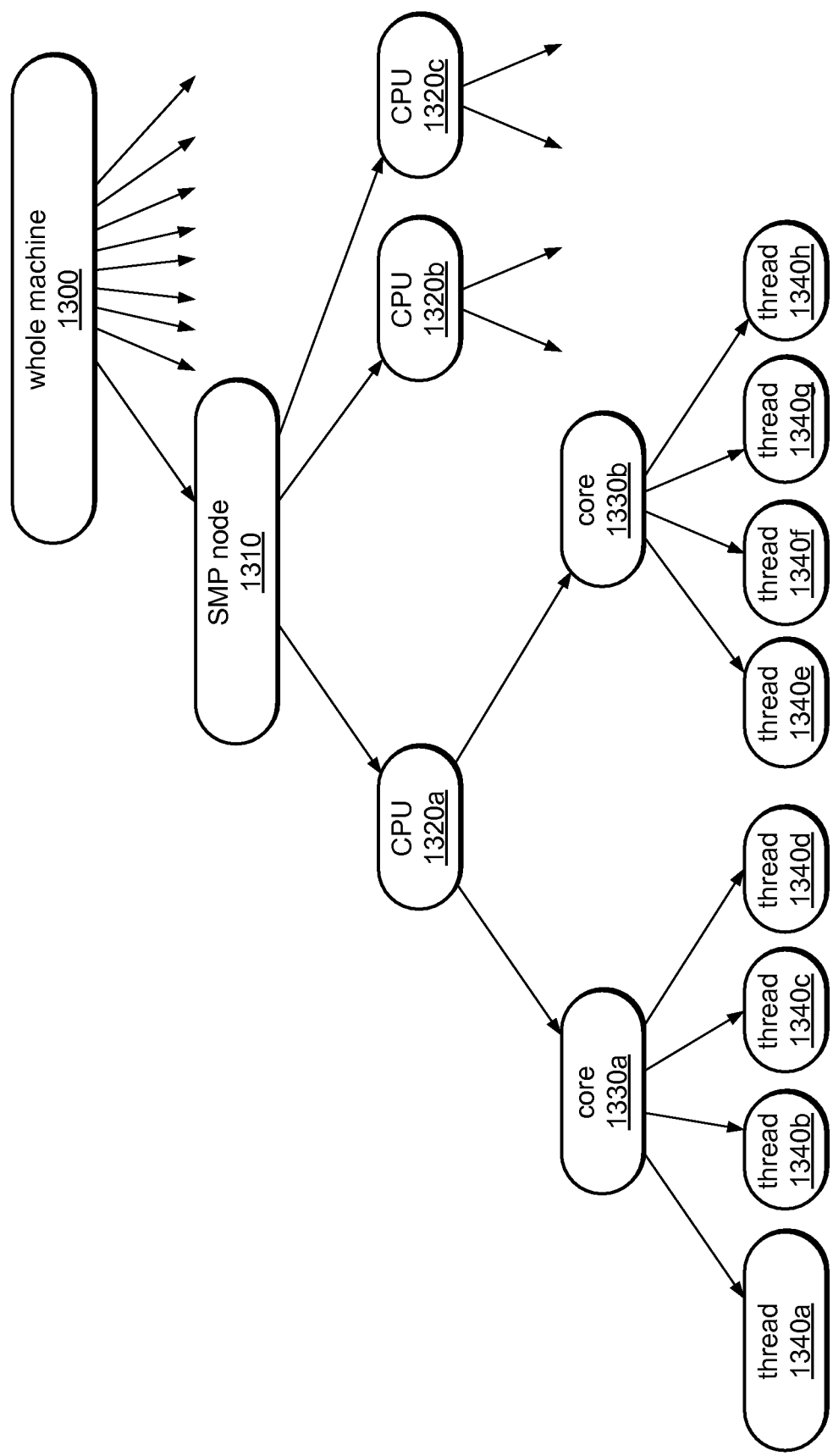
FIG. 13 illustrates a tree-type abstraction of an exemplary computing system suitable for application of distribution data structures and/or locality-guided work stealing, according to one embodiment.

FIG. 13 illustrates a tree-type representation of an exemplary computing system suitable for application of locality-guided work stealing, according to one embodiment. In this example, the machine's structure includes five hierarchical levels, although various machines may be represented using more, fewer, or different levels, in other embodiments. In this example, the top (or root) level of the hierarchy, labeled 1300, represents the whole machine, and the next level, 1310, represents a computing node that includes multiple processors 1320. In this example, each processor 1320 includes multiple cores 1330 (e.g., each processor 1320 may be a chip multi-processor that includes multiple cores on a single die), and each core may execute multiple threads 1340, each maintaining their own hardware processor state. Data and/or computations of an application suitable for parallel execution may be allocated to these processors 1320, cores 1330, and/or threads 1340 using any of the techniques described herein.

Note that, in some cases, the recursive subdivision specified by distributions may be a rather bulky mechanism. It is traditional in work-stealing based systems to cut off recursive subdivision at some point, and to run computations that are "small enough" sequentially on a single processor. This may be accomplished in several ways. In one embodiment, the "sequential" flag may be taken to mean "simply iterate naively over the index space". This may work reasonably well in practice, but may disrupt subdivisions that (for example) follow cache-oblivious ordering. An alternative embodiment of this technique may provide a way for the distribution to specify iteration order in these cases. In either case, it may not be necessary to track placement information within these portions of the index space.

Another embodiment may use dynamic information gathered from scheduling decisions to decide where to serialize threads. In such embodiments, when a deep sub-tree runs on a single processor, nodes deeper in the sub-tree may be serialized in future runs. Note, however, that a distribution may not store any information about the granularity of the computations that are performed at the leaves of the distribution. In particular, the same distribution may be used with both a simple, quick leaf computation (which may suggest serial execution) and a long-running, expensive leaf computation (which may require more adaptive scheduling in order to balance load).

A computing system configured to support parallel programming may employ many of the techniques described herein for locality-guided work stealing and management of the allocation of data and computations to various portions of the system. For example, in one embodiment, the system may be configured to support one or more of the following:

One or more distributions (e.g., a ruler distribution, and/or another distribution), running on top of a work-stealing library augmented with mailboxes.

Tree-structured tracking of scheduling decisions.

Sequential leaves which loop naively.

The ability to specify an initial allocation of threads to processors.

The ability to choose an initial allocation based on work-stealing decisions.

The ability to follow previous work-stealing decisions when scheduling.

A two-level array structure.

A distribution library for one or more programming languages (e.g., Fortress).

Figure 14:
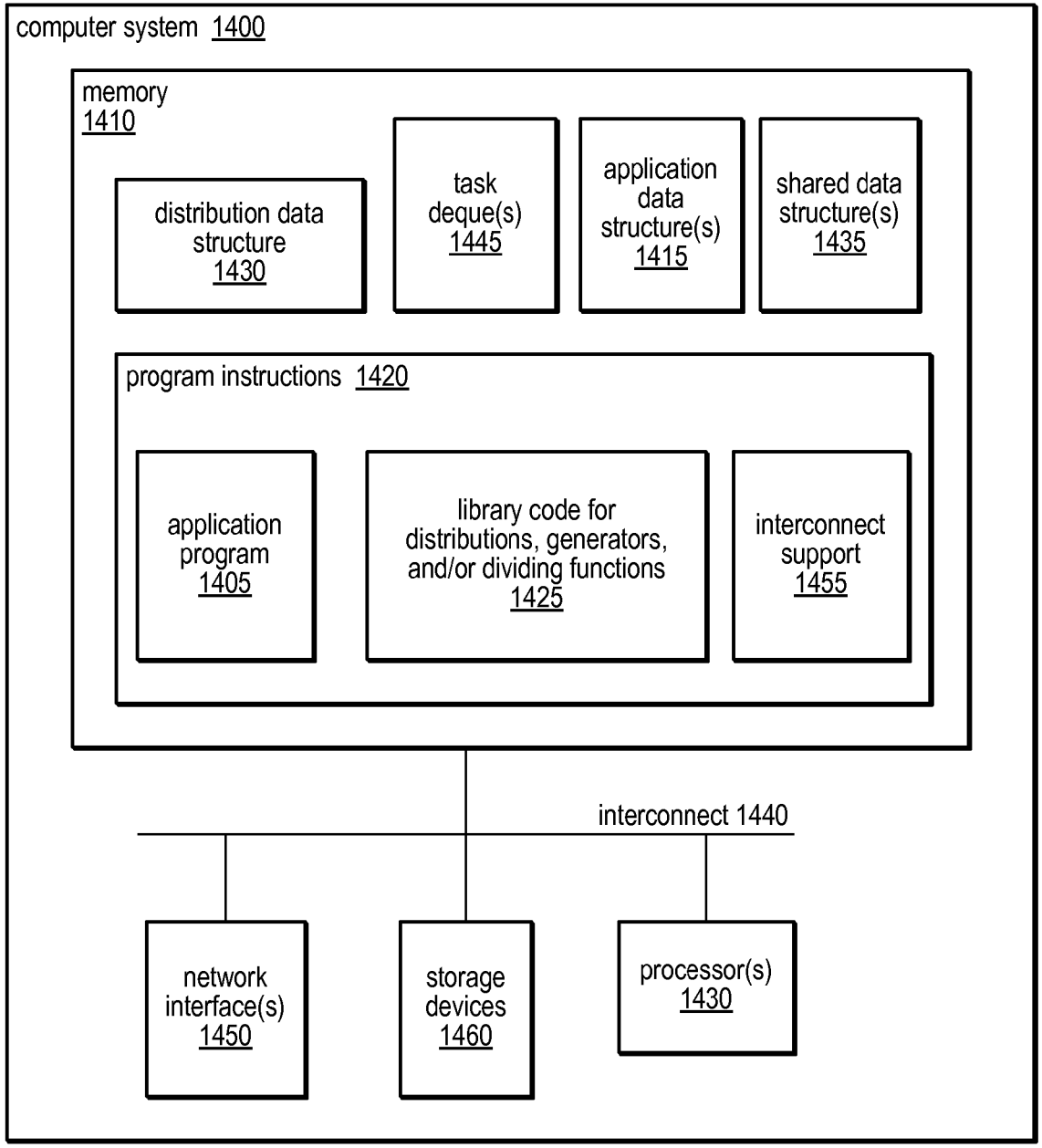
FIG. 14 is a block diagram illustrating an exemplary computer system suitable for implementing distribution data structures and locality-guided work stealing, according to one embodiment.

The system and methods described herein may be suitable for application to any of various computing systems. FIG. 14 illustrates a computing system capable of implementing locality-guided work stealing and/or distribution data structures for tracking and preserving scheduling decisions in parallel computing, according to various embodiments. For example, a computing system configured to carry out the techniques described herein may include multiple computer systems 1400, each of which may include any or all of the components illustrated in FIG. 14. Computer system 1400 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc, or in general any type of computing device. Note that in some embodiments, each node of a computing system configured for parallel processing may comprise a computer system identical or similar to that illustrated in FIG. 14, while in other embodiments, two or more nodes of the computing system may comprise computer systems having more, fewer, or different components than those illustrated in FIG. 14.

The described invention may be provided as a computer program product, or software, that may include a computer-readable storage medium having stored thereon instructions, which may be used to program a computer system (or other electronic devices) to perform a process according to the present invention. A computer-readable medium includes any mechanism for storing information in a form (e.g., software, processing application) readable by a machine (e.g., a computer) and executable by the machine to implement the methods described herein. The machine-readable medium may include, but is not limited to, magnetic storage medium (e.g., floppy diskette); optical storage medium (e.g., CD-ROM); magneto optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.).

A computer system 1400 may include a processor unit 1430 (possibly including multiple processors, a single-threaded processor, a multi-threaded processor, a multi-core processor, etc.). The computer system 1400 may also include one or more system memories 1410 (e.g., one or more of cache, SRAM, DRAM, RDRAM, EDO RAM, DDR RAM, SDRAM, Rambus RAM, EEPROM, etc.), a system interconnect 1440 (e.g., LDT, PCI, ISA, etc.), one or more network interface(s) 1450 (e.g., an ATM interface, an Ethernet interface, a Frame Relay interface, etc.), and one or more storage device(s) 1460 (e.g., optical storage, magnetic storage, etc.). Note that in some embodiments, network interface(s) 1450 may include hardware and/or software support for implementing internal and/or external interconnect techniques (e.g., NAT, load balancing, VPN, WebDAV, etc.). The memory medium may include other types of memory as well, or combinations thereof. Embodiments of the invention may include fewer or additional components not illustrated in FIG. 14 (e.g., video cards, audio cards, additional network interfaces, peripheral devices, etc.). The processor unit(s) 1430, the storage device(s) 1460, the network interface 1450, and the system memory 1410 may be coupled to the system interconnect 1440.

One or more of the system memories 1410 may embody one or more distribution data structures 1430, task deques 1445, and/or shared data structures 1435, as described herein. Note that in some embodiments, distribution data structures 1430, task deques 1445, and/or shared data structures 1435 may be included in one or more storage devices 1460, instead of, or in addition to, being included in system memory 1410. Additionally, one or more of the system memories 1410 may embody customer application code 1405 and/or application data structures 1415 including code configured to implement an array (or other data structure) over which to iterate and/or a computation suitable for allocating for parallel execution on various nodes, processors, cores, etc., as described herein. Note that various elements illustrated in FIG. 14 as residing in memory 1410 may in some embodiments be implemented in different memory spaces (e.g., a shared memory space and one or more local memory spaces) within a single physical memory or as different memory spaces distributed across any number of physical memories devices (e.g., in one or more storage devices 1460 and/or storage devices of a computing system other than computer system 1400), in different embodiments.

In some embodiments, memory 1410 may include program instructions 1420 configured to implement application program code 1405, described above. Program instructions 1420 may also include code configured to implement various library functions 1425. For example, library code 1425 may include program instructions configured to implement various distributions, generators, and/or dividing functions, as described herein. In addition, program instructions 1420 may include program instructions to support internal and/or external interconnect protocols (e.g., NAT or load balancing functionality), in some embodiments. This is shown as interconnect support 1455.

Note that application code 1405, library code 1425, interconnect support 1455, and/or any other instructions included in program instructions 1420 may each be implemented in any of various programming languages or methods. For example, in one embodiment, application program 1405 and library code 1425 may be written in the Fortress programming language, while interconnect support 1455 may be implemented in Java™, C, or C++, among other programming languages. In other embodiments, other combinations of programming languages may be used to implement these components or they may all be written in the same programming language. Note that program instructions 1420 may in some embodiments include instructions configured to implement other functionality not shown, such as a compiler, debugger, operating system, or other standard and/or custom software components of a computing system.

While the invention has been described with reference to various embodiments, it will be understood that these embodiments are illustrative and that the scope of the invention is not limited to them. Although the embodiments above have been described in detail, numerous variations and modifications will become apparent once the above disclosure is fully appreciated. Many variations, modifications, additions, and improvements are possible. More generally, the present invention is described in the context of particular embodiments. For example, the blocks and logic units identified in the description are for understanding the described invention and not meant to limit the described invention. Functionality may be separated or combined in blocks differently in various realizations of the invention or described with different terminology. Plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the invention as defined in the claims that follow. It is intended that the following claims be interpreted to embrace all such variations and modifications.

What is claimed is:

1. A computer-implemented method, comprising:
for a pre-defined iterative computation:
dividing an iteration space over which the iterative computation operates to define two or more items of work that when executed collectively perform the iterative computation;
allocating the two or more items of work on respective nodes of a plurality of nodes for execution in parallel, wherein at least two of the two or more items of work are allocated for execution on different nodes;
recording an indication of the respective node on which each of the two or more items of work was allocated for execution;
executing the iterative computation, wherein said executing comprises executing one of the two or more items of work on a node other than the node on which it was allocated for execution; and updating the indication of the node on which the one of the two or more items of work was allocated for execution to reflect the node on which it is actually executed.

2. The method of claim 1, further comprising:
allocating a subsequent instance of the one of the two or more items of work to the node on which the one of the two or more items of work was actually executed according to the updated indication.

3. The method of claim 1,
wherein said dividing comprises dividing the iteration space of the iterative computation into a plurality of sub-spaces; and
wherein the method further comprises, prior to said allocating:
 allocating data associated with each sub-space on a respective one of the plurality of nodes;
wherein said allocating data comprises allocating data during execution of the iterative computation dependent on a current size or topology of the plurality of nodes; and
wherein said allocating the two or more items of work comprises allocating each item of work to a node on which data of a corresponding sub-space is located.

4. The method of claim 1, wherein said allocating comprises allocating each item of work to a node on which a corresponding portion of a data structure on which the item of work is to be performed is located.

5. The method of claim 4, wherein the data structure is a multidimensional array, the method further comprising, prior to said allocating:
 subdividing the multidimensional array along one or more planes, each orthogonal to an axis of the array; and
 allocating each subdivision of the array to a respective one of the plurality of nodes.

6. The method of claim 1, wherein said recording comprises recording an indication of the respective node on which each item of work was allocated for execution in a data structure that reflects a subdivision of the iteration space of the iterative computation.

7. The method of claim 1, wherein said executing one of the two or more items of work on a node other than the node on which it was allocated for execution is performed in response to a load balancing operation for the plurality of nodes.

8. The method of claim 1, wherein said executing one of the two or more items of work on a node other than the node on which it was allocated for execution is performed in response to a work stealing operation by the other node.

9. The method of claim 1, wherein said executing one of the two or more items of work on a node other than the node on which it was allocated for execution is performed in response to the one of the two or more items of work being posted to a mailbox of the other node.

10. The method of claim 1, wherein said allocating comprises allocating each item of work to a respective node dependent on a load balancing operation for the plurality of nodes.

11. The method of claim 1, wherein said allocating comprises allocating each item of work to a respective node dependent on an initial allocation specified for the iterative computation.

12. A computer readable storage medium storing program instructions computer-executable to implement:
for a pre-defined iterative computation:
 dividing an iteration space over which the iterative computation operates to define two or more items of work that when executed collectively perform the iterative computation;
 allocating the two or more items of work on respective nodes of a plurality of nodes for execution in parallel, wherein at least two of the two or more items of work are allocated for execution on different nodes;
 recording an indication of the respective node on which each of the two or more items of work was allocated for execution;
 executing the iterative computation, wherein said executing comprises executing one of the two or more items of work on a node other than the node on which it was allocated for execution; and
 updating the indication of the node on which the one of the two or more items of work was allocated for execution to reflect the node on which it is actually executed.

13. The storage medium of claim 12, wherein the program instructions are further computer-executable to implement:
 allocating a subsequent instance of the one of the two or more items of work to the node on which the one of the two or more items of work was actually executed according to the updated indication.

14. The storage medium of claim 12, wherein said allocating comprises allocating each item of work to a node on which a corresponding portion of a data structure on which the item of work is to be performed is located.

15. The storage medium of claim 12, wherein said recording comprises recording an indication of the respective node on which each item of work was allocated for execution in a data structure that reflects a subdivision of the iteration space of the iterative computation.

16. The storage medium of claim 12, wherein said executing one of the two or more items of work on a node other than the node on which it was allocated for execution is performed in response to one or more of: a load balancing operation for the plurality of nodes, a work stealing operation by the other node, or the one of the two or more items of work being posted to a mailbox of the other node.

17. A system, comprising:
one or more processors; and
a memory coupled to the one or more processors and comprising program instructions executable by the one or more processors;
wherein the program instructions are executable to implement, for a pre-defined iterative computation:
 dividing an iteration space over which the iterative computation operates to define two or more items of work that when executed collectively perform the iterative computation;
 allocating the two or more items of work on respective nodes of a plurality of nodes for execution in parallel, wherein at least two of the two or more items of work are allocated for execution on different nodes;
 recording an indication of the respective node on which each of the two or more items of work was allocated for execution;
 executing the iterative computation, wherein said executing comprises executing one of the two or more items of work on a node other than the node on which it was allocated for execution; and
 updating the indication of the node on which the one of the two or more items of work was allocated for execution to reflect the node on which it is actually executed.

18. The system of claim 17, wherein the program instructions are further computer-executable to implement:
 allocating a subsequent instance of the one of the two or more items of work to the node on which the one of the two or more items of work was actually executed according to the updated indication.

19. The system of claim 17, wherein said recording comprises recording an indication of the respective node on which each item of work was allocated for execution in a data structure that reflects a subdivision of the iteration space of the iterative computation.

20. The system of claim 17, wherein said executing one of the two or more items of work on a node other than the node on which it was allocated for execution is performed in response to one or more of: a load balancing operation for the plurality of nodes, a work stealing operation by the other node, or the one of the two or more items of work being posted to a mailbox of the other node.

* * * * *

UNITED STATES PATENT AND TRADEMARK OFFICE
CERTIFICATE OF CORRECTION

| | | |
|---|---|---|
| PATENT NO. | : 8,813,091 B2 | Page 1 of 1 |
| APPLICATION NO. | : 12/185619 | |
| DATED | : August 19, 2014 | |
| INVENTOR(S) | : Maessen et al. | |

It is certified that error appears in the above-identified patent and that said Letters Patent is hereby corrected as shown below:

Title page, column 1, under Inventors, line 2, delete "Jaão" and insert -- João --, therefor.

In the Drawings:

On sheet 3 of 11, in figure 3, under Referral number 375, line 1, delete "run f" and insert -- run_f --, therefor.

In the Specification:

In column 2, line 1, delete "by" and insert -- be --, therefor.

In column 14, line 51, delete "note" and insert -- noted --, therefor.

In column 15, line 8, delete "descendents" and insert -- descendants --, therefor.

Signed and Sealed this
Third Day of March, 2015

Michelle K. Lee
*Deputy Director of the United States Patent and Trademark Office*